July 11, 1933.                E. FARKAS                1,917,578
PHOTOGRAPHIC FOLDING CAMERA
Filed July 29, 1932
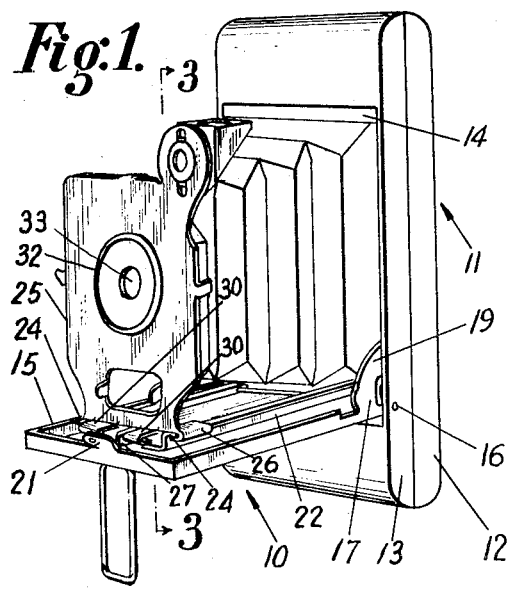
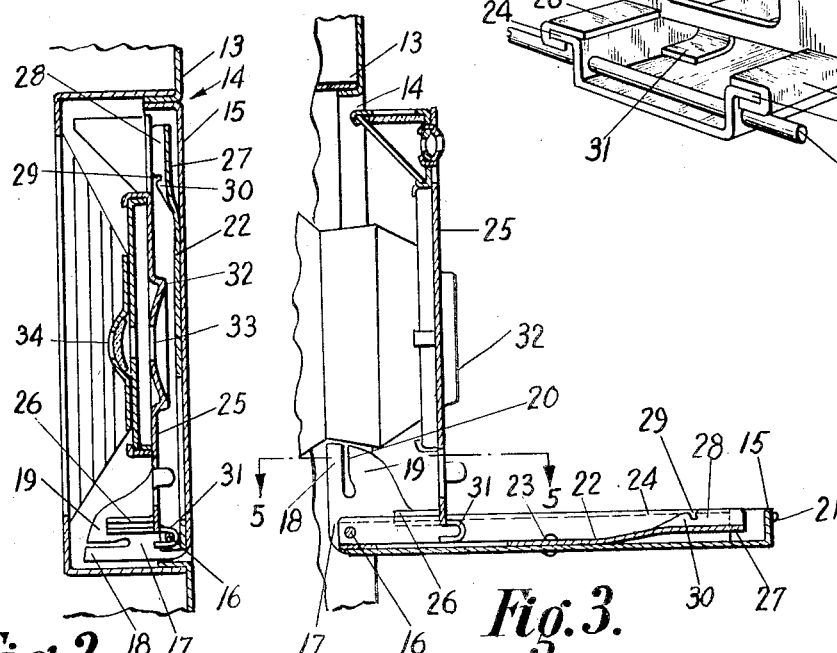
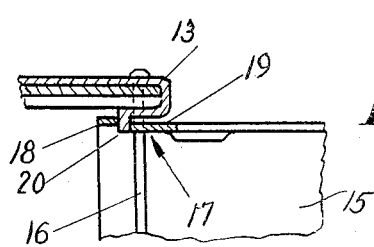
INVENTOR
Eugene Farkas
BY Joseph Blacker
ATTORNEY Patented July 11, 1933

1,917,578

UNITED STATES PATENT OFFICE

EUGENE FARKAS, OF BROOKLYN, NEW YORK

PHOTOGRAPHIC FOLDING CAMERA

Application filed July 29, 1932. Serial No. 626,111.

The present invention relates to a folding camera of the type in which the lens carriage is supported in slidable relation with an extension bed into and out of focusing position, the lens carriage or front being drawn out and locked in a single position or fixed focus on the extension bed for photographing at all distances. When extended for use, the camera has a considerable focal length, but when folded forms a compact package.

An object of this invention is to provide efficient means for maintaining the lens carriage rigid when in right-angular relation with the extension bed in focused position.

Another object of this invention is to provide grip means integral with the lens carriage for swinging the extension bed in parallel relation with the casing when the carriage is disengaged from guide rails on the bed.

Another object of this invention resides in the particular arrangement and structural features of the cooperating elements, which make the device automatic in its action.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a perspective view of the camera in position for taking a photograph.

Figure 2 is a sectional view of the camera in a closed position.

Figure 3 is a sectional view of the camera, the section being taken as on line 3—3 in Figure 1.

Figure 4 is a rear view of the lens carriage mounted in slidable relation with guide rails on the extension bed.

Figure 5 is a sectional view taken as on line 5—5 in Figure 3.

In the illustrated embodiment of the invention, the numeral 10, represents my folding camera comprising a two-piece rectangular casing 11, of relatively small depth and consists of a rear casing member 12, and a front casing member 13. The front casing member 13, is provided with an aperture 14. A door 15, is mounted in said aperture on a pivot pin 16, extending crosswise at the lower end of the aperture. The door 15, is provided with angular extensions 17, at the end adjacent the pivot pin 16. Each extension 17, is cut through to form a rear portion 18, and a front portion 19. The rear portion 18, is bent to engage with an inward extension 20, in the aperture 14, of the front casing portion 13, when the door is swung outwardly in substantially right-angular relation with the casing and serves as a stop to limit the outward swing of the door to a predetermined maximum. The front portion 19, is shaped to form spring means which engages with the front casing portion 13, for locking the door against inward rotation. The door is also provided with integral spring means 21, at its free end for locking the door in a closed position. The door 15, illustrated herewith is constructed substantially as fully shown and described in my copending application for patent for Photographic folding camera, Serial No. 460,624, filed June 12, 1930, and which has been allowed on February 3, 1932.

An extension bed 22, has been fastened to the door 15, by means of a rivet 23, and comprises two parallel rails 24, 24, positioned above the bed and above the pivot pin 16. As best shown in Figure 4, a lens carriage 25, built of a rectangular plate having angularly extending U-shaped arms 26, 26, facing rearwardly at its lower end and adapted for sliding engagement with the rails 24, 24, is mounted on the extension bed 22, with the arms 26, 26, facing the pivot pin 16. A spring 27, integral with the extension bed 22, intermediate the rails 24, 24, faces upwardly and is provided with right-angular extensions 28. Each extension 28, has a notch 29, serving to receive the lens carriage 25, in focusing position, the carriage being held against further outward movement by an elevated stop formed by the end portion of the extensions 28, which is higher than an angular portion 30. The function of the spring 27, is to press upwardly when flexed by engagement against the underside of the lens carriage and assists in holding the lens carriage rigidly to the rails 24, 24, so that any play between the lens carriage and the rails due to wear will be compensated for and the lens carriage held steady and erect in operative position. When the lens carriage is moved inwardly of the aperture 14, it becomes disengaged from the rails. The lens carriage is also provided with forwardly extending hook portions 31, at the lower end, the said hook portions being adapted to engage with the pivot 16, in the extension bed 22, when the lens carriage is disengaged from the rails. It will thus be noted that the rails are in right-angular relation with the casing when in focusing position, and in parallel relation with the casing when the camera is in folded position. The lens carriage is also provided with a forwardly extending boss 32, having an aperture 33, in central alignment with the lens 34.

Having thus described my invention, I claim as new and desire to secure by Letters Patent:

1. In a folding camera, the combination with a casing having an aperture in its front face, a pivot pin at the lower end of said aperture, a door mounted on said pivot pin and adapted to be swung outwardly in right-angular relation with said casing, an extension bed fastened to said door and comprising two parallel rails, a lens carriage adapted for sliding engagement in right-angular relation with said rails and movable thereon to focusing position, yielding spring means integral with said extension bed for tensioning the lens carriage in an upward direction against the rails when the said carriage is in focusing position and grip means integral with said carriage and adapted for engagement with said pivot pin for swinging said extension bed in parallel relation with said casing when said carriage is disengaged from said rails.

2. In a folding camera, the combination with a casing having an aperture in its front face, a pivot pin at the lower end of said aperture, a door mounted on said pivot pin and adapted to be swung outwardly in right-angular relation with said casing, an extension bed fastened to said door and comprising two parallel rails, a lens carriage adapted for sliding engagement in right-angular relation with said rails and movable thereon to focusing position, yielding spring means integral with said extension bed intermediate said rails for tensioning the lens carriage in an upward direction against the rails when the said carriage is in focusing position, said spring means being provided with right-angular extensions each having a notch and and elevated stop to receive and lock the lens carriage, and U-shaped grip means integral with said carriage and adapted for engagement with said pivot pin for swinging said extension bed in parallel relation with said casing when said carriage is disengaged from said rails.

3. In a folding camera, the combination with an extension bed pivotally mounted in an opening in said camera and adapted to be swung in right-angular relation with the camera casing and comprising two parallel rails, a lens carriage having angularly extending U-shaped arms at its lower end for engagement with said rails, said carriage being adapted to slide in right-angular relation with said rails and movable thereon to focusing position, yielding spring means integral with said extension bed for tensioning the lens carriage in an upward direction against the rails when the said carriage is in focusing position and grip means integral with said carriage and adapted for engagement with said pivot means for swinging said extension bed in parallel relation with said casing when said carriage is disengaged from said rails.

4. In a folding camera, the combination with an extension bed having two parallel rails and being pivotally mounted in an opening in said camera and adapted to be swung outwardly in right-angular relation with the camera casing, a lens carriage having angularly extending U-shaped arms at its lower end for engagement with said rails, said carriage being adapted to slide in right-angular relation with said rails and being movable outwardly thereon to a fixed stop at focusing position and being disengageable from said rails when moved inwardly of said opening, yielding spring means integral with said extension bed for tensioning the lens carriage in an upward direction against the rails when the said carriage is in focusing position and grip means integral with said carriage and adapted for engagement with said pivot means for swinging said extension bed in parallel relation with said casing when said carriage is disengaged from said rails.

5. In a folding camera, the combination with a casing having an opening and a movable closure mounted on pivot means in said opening, said closure being designed to be swung outwardly in substantially right-angular relation with said casing, an extension bed fastened to said closure and comprising two parallel rails, a lens carriage adapted for sliding engagement in right-angular relation with said rails and being movable thereon to focusing position, said extension bed having spring means for tensioning the lens carriage against the rails when the said carriage is in focusing position, said carriage having grip means adapted for engagement with said pivot means for swinging said extension bed in parallel relation with said casing when said carriage is disengaged from said rails.

Signed at New York, in the county of New York and State of New York this 28th day of July A. D. 1932.

EUGENE FARKAS.